April 13, 1954     D. I. BOHN     2,675,022
INJECTION VALVE AND ACTUATING MEANS THEREFOR
Filed June 9, 1949     2 Sheets-Sheet 2
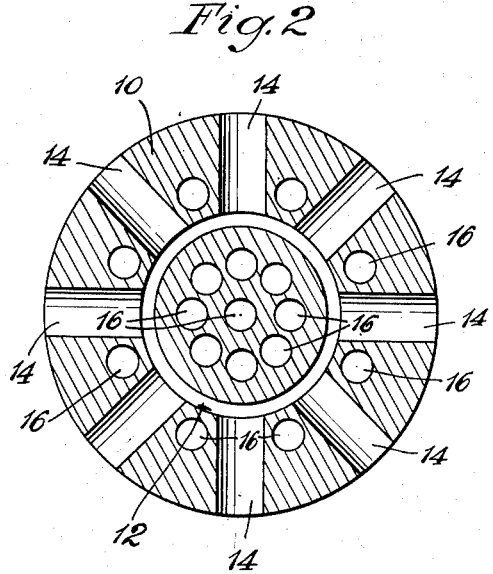
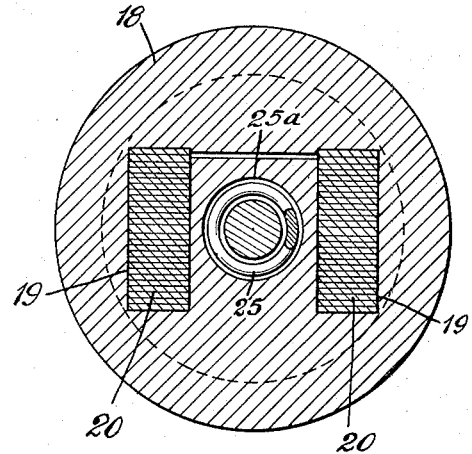
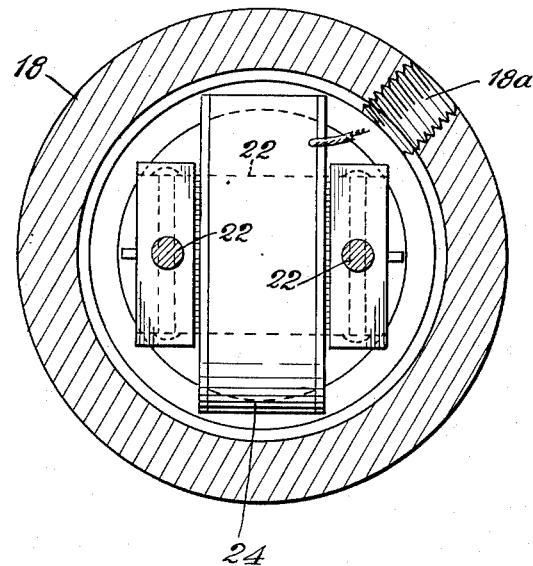
Inventor
Donald I. Bohn
by Parker & Carter
Attorneys Patented Apr. 13, 1954

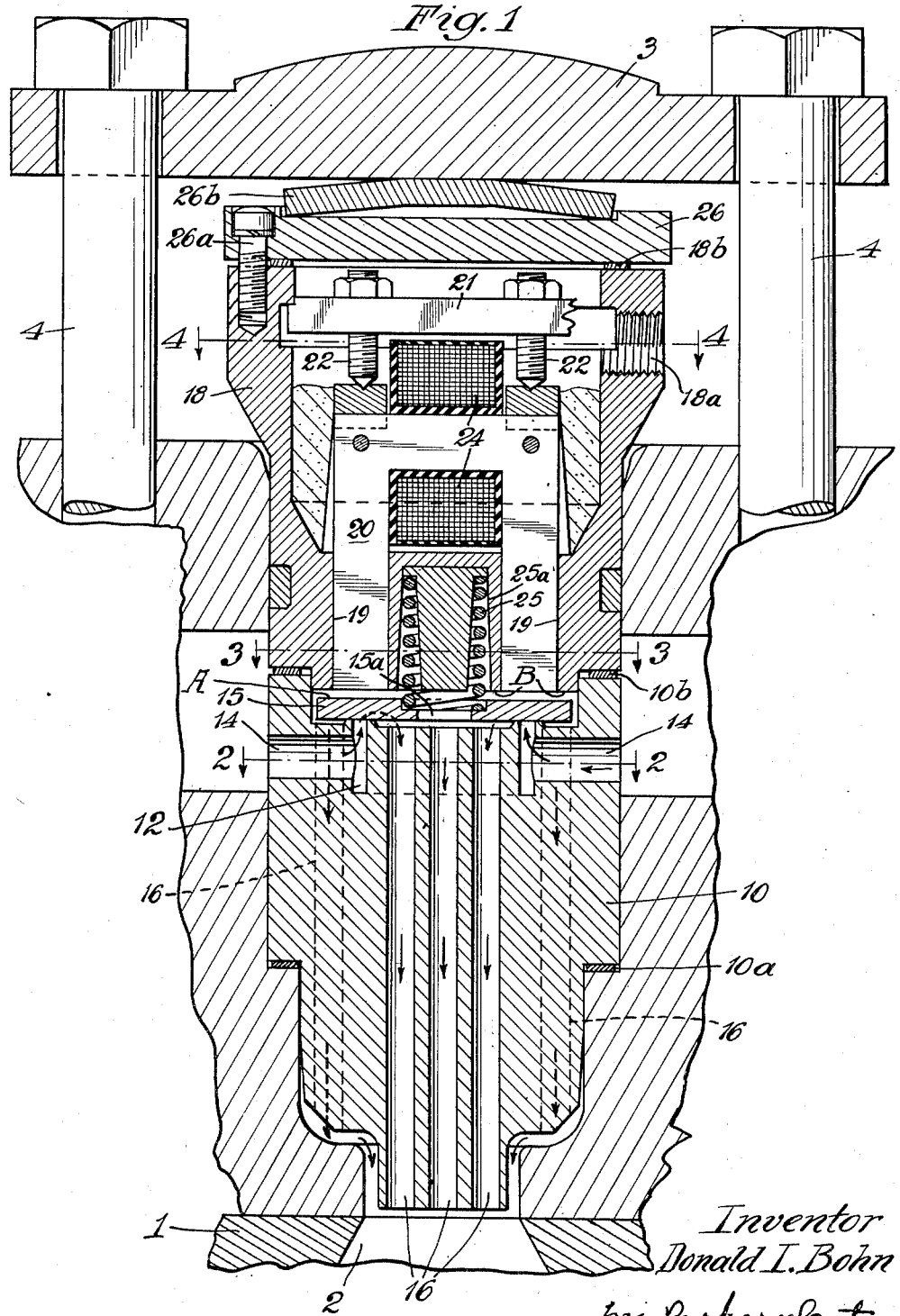

2,675,022

UNITED STATES PATENT OFFICE 2,675,022

INJECTION VALVE AND ACTUATING MEANS THEREFOR

Donald I. Bohn, Pittsburgh, Pa.

Application June 9, 1949, Serial No. 98,130

3 Claims. (Cl. 137—597)

My invention relates to an improvement in valves and in valve actuating structures.

One purpose is to provide a valve structure adaptable for use in diesel engines and the like.

Another purpose is to provide an improved fuel valve structure adapted to the accurate and efficient control of the flow of fuel to the combustion chamber of an engine.

Another purpose is to provide a valve structure adapted to maintain a correct and sufficient port area.

Another purpose is to provide a valve structure adaptable for use in connection with magnetic valve actuating means.

Another purpose is to provide an improved porting arrangement.

Another purpose is to provide an improved valve disk assembly.

Another purpose is to provide a valve structure in which electromagnetic force may be used to operate moving parts of the valve, with a substantial elimination of inertia and wear.

Another purpose is to provide a simplified valve assembly.

Other purposes will appear from time to time in the course of the specification and claims.

I illustrate the invention more or less diagrammatically in the accompanying drawings wherein:

Figure 1 is an axial section illustrating my valve assembly in connection with the inlet to a combustion chamber;

Figure 2 is a section on the line 2—2 of Figure 1;

Figure 3 is a section on the line 3—3 of Figure 1;

Figure 4 is a section on the line 4—4 of Figure 1.

Referring to the drawings, 1 generally indicates the wall of a combustion chamber, and 2 a suitable inlet aperture with which my valve structure is aligned. I may, for example, illustrate the cylinder head of one cylinder of a radial engine, but it will be understood that I do not wish to limit myself to the use of my valve assembly and valve actuating means with any particular engine structure or type. It will be understood that a valve unit, such as is illustrated in the drawings and is below described, may be bolted or otherwise secured through the medium of a clamping bridge 3, with its holding bolts 4, to each of the cylinders of a radial engine disposed with its crankshaft in a vertical plane.

In considering an individual valve unit, as shown in axial section in Figure 1, 10 indicates a lower valve body, which may be suitably formed of any suitable material. For example, it may preferably be turned from a strong aluminum alloy or non-magnetic brass bar. 12 indicates a fuel or gas port in the form of a circular groove which may, for example, be 1/8" x 5/8" deep and which is in direct communication with an intake manifold through eight radial passages 14, as shown in Figure 2. An advantage of the relatively deep and narrow annular port 12, in contrast to the usually employed circular port in poppet valve design, is the provision of a long perimeter with small cross-sectional area. The advantages of this structure will be further commented on below.

15 indicates a valve disk which may be of Armco magnetic iron and which is disposed in a recess in the top surface of the valve body 10. I illustrate the valve body 10 as provided with a plurality of vertical apertures 16 to conduct fuel or gas downwardly into the combustion chamber of each cylinder when the disks 15 are raised from their seats to uncover ports 12 and passages 16. In other words, when the disk 15 is raised, the fuel flow is radially inwardly along the passages 14, upward through the port 12 of each valve assembly, and then inwardly and downwardly to the various valve passages 16, in the direction of the arrows of Figure 1. The valve disk 15 is normally urged toward the closed position in which it is shown in Figure 1, as will be below described.

The upper valve body 18, which may be fabricated from an extruded aluminum alloy or brass section, is formed with two preferably generally rectangular slots or openings 19, which extend therethrough from top to bottom. The upper valve member 18 may be turned or otherwise formed to provide the external stepped configuration illustrated in Figure 1.

A fully laminated transformer iron magnet 20 is employed, in the shape of an inverted U, with its depending legs inserted within the slots 19 of the upper valve body 18. It may be secured in place, for example, by a cross bar 21 and suitable studs or securing members 22. A magnet energizing coil 24 is wound upon the horizontal upper tie leg of the magnet 20, the cross bar 21 abutted upwardly against an overlying wall portion of the valve body 18. The valve body is tapped, as at 18a, to receive any suitable spark plug, which serves as one lead to the coil 24 from a suitable external electrical system. The other lead to the coil may be internally ground and no sealed bushing through the valve body 18 is required. The magnet 20 is preferably laminated, but a solid magnet may be employed, if desired.

The coil spring 25, within a recess 25a in the lower portion of the valve body 18, is effective normally to urge the valve disk 15 toward closed position in relation to the port 12 and the passage 16. A cap 26 encloses the upper end of the valve assembly. It may be held in closed position, for example, by screws 26a. The entire assembly is held in position by the clamping bridge 3, which may direct its thrust against the cap 26 through any suitable washer 26b.

The space in the upper portion of the upper valve member 18, adjacent the magnet 20 and the coil 24, is suitably filled with a special compound to eliminate the presence of a dead air space. The upper and lower valve bodies 10 and 18 may be suitably gasketed, as at 10a, 10b and 18b, to prevent leakage.

While I do not wish to be limited to any specific measurements or proportions, I may mention the following dimensions as illustrative.

In the particular drawing herein shown, the valve disk 15 may be considered as designed to lift 0.050". The magnet 20 may provide a pull or lifting force of 68 pounds to raise the disk 0.050". The identical magnet may have an 11 pound pull where the gap is ⅛". Hence, if the disk 15 were to be employed to seat upon a circular port of usual poppet construction, say a ¾" diameter circular port, and a fuel or gas pressure of 30 pounds were impressed on the disk 15, a 25 pound spring would be required to counteract the manifold pressure, and a $\frac{5}{32}$" minimum lift would be necessary to provide a sufficient port entry to fuel incoming to the engine. An electromagnet effective to accomplish a $\frac{5}{32}$" lift for a ¾" diameter circular port valve disk, against a spring pressure of 25 pounds, would be out of all practical proportions. In the structure herein shown, however, the use of an electromagnet is practical and efficient. With the long perimeter and small cross-sectional area of the circumferential valve port 12, the relationship of perimeter to lift provides sufficient entrance area for the injection of fuel with a lift of $\frac{1}{16}$" or less (0.050") of the valve disk 15, while at the same time exposing a relatively small area of the disk 15 to fuel or gas pressure. Incidentally, the disk 15 is centrally perforated as at 15a. The disk 15, on injection, forms a seal between its upper surface A and the lower surface B of the upper valve member 18. The advantage of perforating the disk 15 is to reduce its weight, as its central aperture does not perform any other function.

In considering the valve design per se, the principles incorporated in its construction may be expressed as follows:

1. For a given valve lift, the area of the fuel or gas entrance to the combustion chamber, when the port is uncovered by the valve disk, is in proportion to the perimeter of the port.

2. The fuel or gas pressure on the valve disk, which the disk closing spring must exceed, and which in turn must be exceeded by the magnetic opening force, is in proportion to the area of the intake port in direct contact with the disk.

3. These considerations for any given valve lift will indicate that the ratio of port perimeter to port area will be much greater than will normally exist where the port is circular.

In energizing the above described electromagnet, a variety of means may be employed. For example, alternators may be employed for delivering timed electrical impulses for the electromagnetic coil of each of the eleven cylinders of the particular radial engine to which the above described valve structure has been applied.

I claim:

1. A fuel inlet valve structure for use with an internal combustion engine cylinder including a generally elongated valve body adapted for positioning adjacent the cylinder, said valve body having a plurality of spaced fuel delivery passages extending longitudinally thereof for delivering fuel to the cylinder, said valve body having a generally circular groove forming a recess at one end thereof opposite to the cylinder end of the body, a plurality of fuel inlet passages positioned intermediate the ends of said body and being formed and adapted to deliver fuel from the exterior of said body to said recess, a movable valve member positioned adjacent said recess and adapted, in one position thereof to close said recess and in another position spaced from said recess to provide an entrance area for fuel proportional to the perimeter of said recess between said recess and said delivery passages, resilient means for biasing said member toward its recess closing position, and means for moving said valve member periodically to open position.

2. A fuel inlet valve structure for use with an internal combustion engine cylinder including a generally elongated valve body adapted for positioning adjacent the cylinder, said valve body having a plurality of spaced fuel delivery passages extending longitudinally thereof for delivering fuel to the cylinder, said valve body having a peripheral recess terminating in a pair of spaced lips at one end thereof opposite to the cylinder end of the body, said recess communicating with said delivery passages, at least one inlet passage positioned intermediate the ends of said body and being formed and adapted to deliver fuel from the exterior of said body to said recess, a movable valve member positioned adjacent said recess and adapted, in one position thereof to close said recess and in another position to define, with said recess, an entrance area for fuel proportional to the perimeter of the recess, resilient means for biasing said member toward its recess closing position, and means for moving said valve member periodically to open position.

3. A fuel inlet valve structure for use with an internal combustion engine cylinder including a generally elongated valve body adapted for positioning adjacent the cylinder, said valve body having a plurality of spaced fuel delivery passages extending longitudinally thereof, said valve body having an elongated groove extending around the longitudinal axis of the body, said groove providing a peripheral recess at one end thereof opposite to the cylinder end of the body, said recess being disposed intermediate said fuel delivery passages to permit the flow of fuel from said recess to said delivery passages in two directions from said recess, at least one fuel inlet passage positioned intermediate the ends of said body and being formed and adapted to deliver fuel from the exterior of said body to said recess, a movable valve member positioned adjacent said recess and adapted, in one position thereof to close said recess and in another position to define with said recess, an entrance area for fuel proportional to the perimeter of the recess, resilient means for biasing said member toward its recess closing position, and means for moving said valve member periodically to open position.

References Cited in the file of this patent

UNITED STATES PATENTS

| Number | Name | Date |
|---|---|---|
| 1,199,792 | Hope-Jones | Oct. 3, 1916 |
| 2,003,814 | Taylor | June 4, 1935 |
| 2,141,069 | Newell | Dec 20, 1938 |
| 2,245,975 | Griswold | June 17, 1941 |
| 2,261,562 | Ray | Nov. 4, 1941 |
| 2,321,853 | Ray | June 15, 1943 |
| 2,353,848 | Ray | July 18, 1944 |
| 2,461,772 | Ray | Feb. 15, 1949 |
| 2,491,905 | Ray | Dec. 20, 1949 |
| 2,548,239 | Ray | Apr. 10, 1951 |

FOREIGN PATENTS

| Number | Country | Date |
|---|---|---|
| 616,502 | Germany | July 30, 1935 |